Dec. 24, 1957 W. J. COYLE 2,817,797
RECTIFIER
Filed Nov. 23, 1953

INVENTOR:
WILLIAM J. COYLE,
BY Robert E Ross
ATTORNEY.

United States Patent Office 2,817,797
Patented Dec. 24, 1957

2,817,797
RECTIFIER

William J. Coyle, Waltham, Mass., assignor, by mesne assignments, to United-Carr Fastener Corporation, Boston, Mass., a corporation of Delaware Application November 23, 1953, Serial No. 393,808

1 Claim. (Cl. 317—234)

This invention relates generally to rectifiers and the like, and has particular reference to a hermetically sealed rectifier which is adapted for rapid and economical manufacture.

In the construction of certain types of electronic apparatus for military purposes, it is essential that some of the components therein be sealed against dust and moisture to prevent failure of the apparatus during use, and to prevent deterioration during storage prior to use. In the past such components have been sealed by potting them in various types of plastics, however such procedures are expensive and time consuming, and are not adapted to volume production of small pieces.

The object of this invention is to provide a hermetically sealed rectifier assembly which is readily adapted for quantity production.

A further object of the invention is to provide a sealed rectifier assembly which has internal spring means bearing rectifier plates into position and completing an electric circuit thereto.

Other objects of the invention will, in part, be obvious, and will, in part, appear hereinafter.

Figure 1:
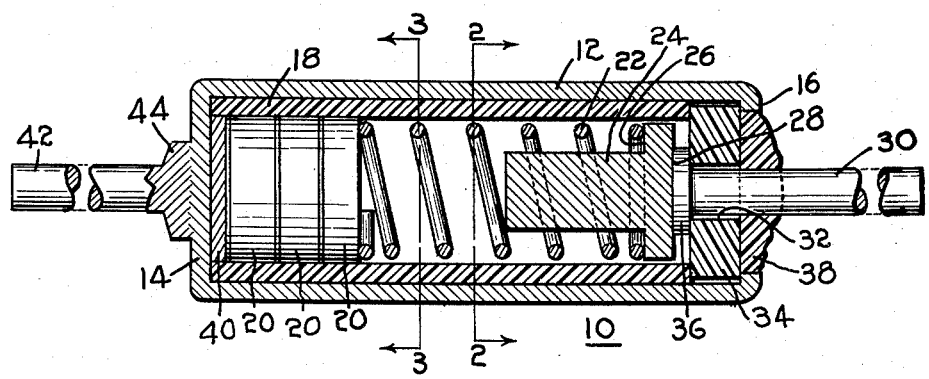
Fig. 1 is a view in section of a rectifier assembly embodying the features of the invention.
Figure 2:
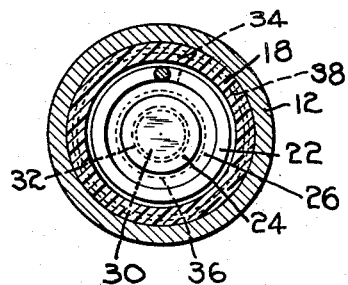
Fig. 2 is a view in section taken on line 2—2 of Fig. 1.
Figure 3:
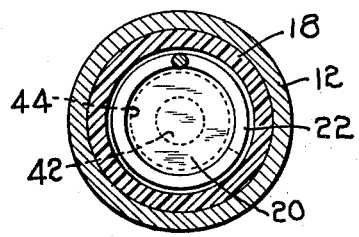
Fig. 3 is a view in section taken on line 3—3 of Fig. 1.

Referring to the drawing, there is illustrated a rectifier assembly 10, in which the rectifier portion is hermetically sealed, to permit use of the rectifier under conditions of extreme dampness or conditions of changing temperature and pressure.

The rectifier assembly 10 comprises generally a hollow metal housing 12, having a closed end 14 and an open end 16. Assembled into the housing 12 is an insulating sleeve 18 and a series of rectifier plates 20 assembled in the insulating sleeve at one end of the housing. The plates 20 are disposed in the usual manner, with corresponding sides facing in the same direction, so that current may pass in only one direction through the plate assembly.

To retain the plates in position and to insure good electrical contact therebetween, a spring member 22 is disposed in the housing in the compressed condition with one end bearing against the adjacent rectifier plate and the other end bearing against a contact member 24, which has a peripheral portion 26 against which the spring seats and a medial portion 28 extending into the bore of the spring.

To make an electrical connection to one side of the rectifier plates, a connector wire 30 extends into the open end of the housing through an aperture 32 in an insulating washer 34, and terminates in a headed end 36, against which the contact member 24 bears.

To hermetically seal the housing 12, a sealing compound 38 is disposed about the connector wire 30 at the open end 16 of the housing. The sealing compound may be one of several materials such as plastic, glass, or ceramic. Such compounds are well known in the art and need not be described here.

To complete an electric circuit through the rectifier, the rectifier plates are so disposed that the end opposite the spring is in electrical contact with the housing 12. In the illustrated embodiment the connection is made through a conducting washer 40. However, in some cases the adjacent rectifier plate may bear directly against the closed end of the housing.

To complete an electric circuit from the housing, a second connector wire 42 having a headed end 44 is secured to the exterior surface of the housing by butt welding or the like.

The illustrated assembly is readily adapted to rapid and economical assembly, since the second connector wire may be attached to the housing prior to the assembly of the rectifier plates and thereafter the internal parts may be loaded in the open end of the housing and retained therein by crimping the open end of the housing inwardly.

The sealing operation may be done at a later stage in the assembly, and since only one end of the device need be sealed, this operation can be rapidly accomplished on automatic machinery.

Since certain obvious changes may be made in the illustrated device without departing from the scope of the invention, it is intended that all matter contained herein be interpreted in an illustrative and not in a limiting sense.

I claim:

A sealed rectifier assembly, comprising a hollow metallic body having a closed end and an open end with inwardly turned portions, an insulating sleeve disposed in the body, a rectifier stack disposed in the sleeve, spring means disposed between the rectifier plate assembly and the open end of the housing and biasing the rectifier plate assembly toward the closed end of the body, a first connector wire extending into the open end of the body and terminating in a beaded end, an insulating retaining washer disposed about the connector wire between the beaded end and the inwardly turned portions of the closed end retaining the connector wire, spring means, and rectifier stack assembly in the body, means in the body making electric contact between the first connector wire and one end of the rectifier stack, the other end of the stack being in electric contact with the interior surface of the body, and a second connector wire disposed outside the body and having an end thereof welded to the outer surface of the body.

References Cited in the file of this patent
UNITED STATES PATENTS

| | | |
|---|---|---|
| 1,708,573 | Hartmann et al. | Apr. 9, 1929 |
| 1,751,360 | Ruben | Mar. 18, 1930 |
| 2,314,104 | Richards et al. | Mar. 16, 1943 |
| 2,454,846 | Skinker | Nov. 30, 1948 |
| 2,498,666 | Escoffery et al. | Feb. 28, 1950 |
| 2,536,698 | Ruben | Jan. 2, 1951 |
| 2,739,275 | Houtz et al. | Mar. 20, 1956 |

FOREIGN PATENTS

| | | |
|---|---|---|
| 929,594 | France | July 15, 1947 |